US011755352B2

(12) United States Patent
Gurajada

(10) Patent No.: US 11,755,352 B2
(45) Date of Patent: Sep. 12, 2023

(54) AUTOMATED C-STRUCTURE INTROSPECTION AND DISCOVERY

(71) Applicant: Salesforce, Inc., San Francisco, CA (US)

(72) Inventor: Aditya Prasad Gurajada, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/804,988

(22) Filed: Jun. 1, 2022

(65) Prior Publication Data

US 2023/0069638 A1 Mar. 2, 2023

Related U.S. Application Data

(60) Provisional application No. 63/237,210, filed on Aug. 26, 2021.

(51) Int. Cl.
*G06F 9/44* (2018.01)
*G06F 9/455* (2018.01)
*G06F 11/36* (2006.01)

(52) U.S. Cl.
CPC ........ *G06F 9/45512* (2013.01); *G06F 11/362* (2013.01)

(58) Field of Classification Search
None
See application file for complete search history.

(56) References Cited

U.S. PATENT DOCUMENTS

| | | | |
|---|---|---|---|
| 2007/0073706 A1* | 3/2007 | Ebie | G06F 16/972 |
| 2011/0209125 A1* | 8/2011 | Stone | G06F 8/71 |
| | | | 717/127 |
| 2011/0231816 A1* | 9/2011 | Zvibel | G06F 8/436 |
| | | | 717/114 |
| 2022/0035821 A1* | 2/2022 | Chen | G06F 8/75 |
| 2022/0365758 A1* | 11/2022 | Rehman | G06F 8/75 |

* cited by examiner

*Primary Examiner* — Insun Kang
(74) *Attorney, Agent, or Firm* — Holland & Hart LLP

(57) ABSTRACT

Methods, apparatuses, and computer program products are described. A system may run a set of Automated Structure processing (ASP) scripts on a program binary executable written in C-language without making changes to source-code. The system may generate a set of dictionary files indicating data structural information specifically for the C-language program based on running the set of ASP scripts on the program binary executable. The dictionary files may include a list of C-structures referenced and type definitions and structure layouts associated with the C-structures. The system may combine the data structural information with an ASP library to generate an extended ASP library, and may augment the program binary executable with the extended ASP library to generate an augmented program binary executable. The system may programmatically perform an introspection and data discovery procedure on a C-language program at run-time using the augmented program binary executable.

20 Claims, 8 Drawing Sheets

AUTOMATED C-STRUCTURE INTROSPECTION AND DISCOVERY

CROSS REFERENCE

The present application for patent claims the benefit of U.S. Provisional Patent Application No. 63/237,210 by GURAJADA et al., entitled "ACSID: AUTOMATED C-STRUCTURE INTROSPECTION AND DISCOVERY," filed Aug. 26, 2021, assigned to the assignee hereof, and expressly incorporated by reference herein.

FIELD OF TECHNOLOGY

The present disclosure relates generally to database systems and data processing, and more specifically to Automated C-Structure Introspection and Discovery (ACSID).

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A running software program may use introspection and discovery to examine the state of its own data structures. Some programming languages, such as Objective-C, C++, C#, and Java, among other examples, may intrinsically provide introspection and data discovery capabilities. However, the C programming language may lack support for introspection, and as such, a user may be unable to perform introspection at run-time for systems software developed in C.

DETAILED DESCRIPTION

A running software program may use introspection and discovery to examine the state of its own data structures. For example, type introspection may be the ability of the program to examine the type or properties of its data structures at runtime. Some programming languages, such as Objective-C, C++, C#, and Java, among other examples, may intrinsically provide introspection and data discovery capabilities. However, the C programming language may lack support for introspection, and as such, a user may be unable to perform introspection at run-time for systems software developed in C.

The approaches described herein detail an Automated C-Structure Introspection and Discovery (ACSID) procedure. A system, which may include Automated Structure processing (ASP) machinery, may run a set of ASP scripts on a program binary executable (e.g., a postgres binary) written in C-language, in some cases, without making changes to the source-code of a corresponding program. The system may generate a set of dictionary files indicating data structural information for the program binary executable, where the data structural information may describe the data structures and type systems in use by the program binary executable (e.g., a running C program). In some examples, the data structural information may be combined with an ASP library to generate an extended ASP library. In some cases, the ASP library may be used to perform introspection. The system may augment the program binary executable with the extended ASP library to generate an augmented program binary executable such that the introspection capabilities of the ASP library may be applied to the program binary executable. Using the augmented program binary executable, at run-time, the system may programmatically perform an introspection procedure of member data structures to extract their data type and value and perform a data discovery procedure on a C-language program, in some cases, without making changes to the source-code of a corresponding program.

Aspects of the disclosure are initially described in the context of an environment supporting an on-demand database service. Aspects of the disclosure are then described in the context of a process flow. Aspects of the disclosure are further illustrated by and described with reference to apparatus diagrams, system diagrams, and flowcharts that relate to ACSID.

Figure 1:
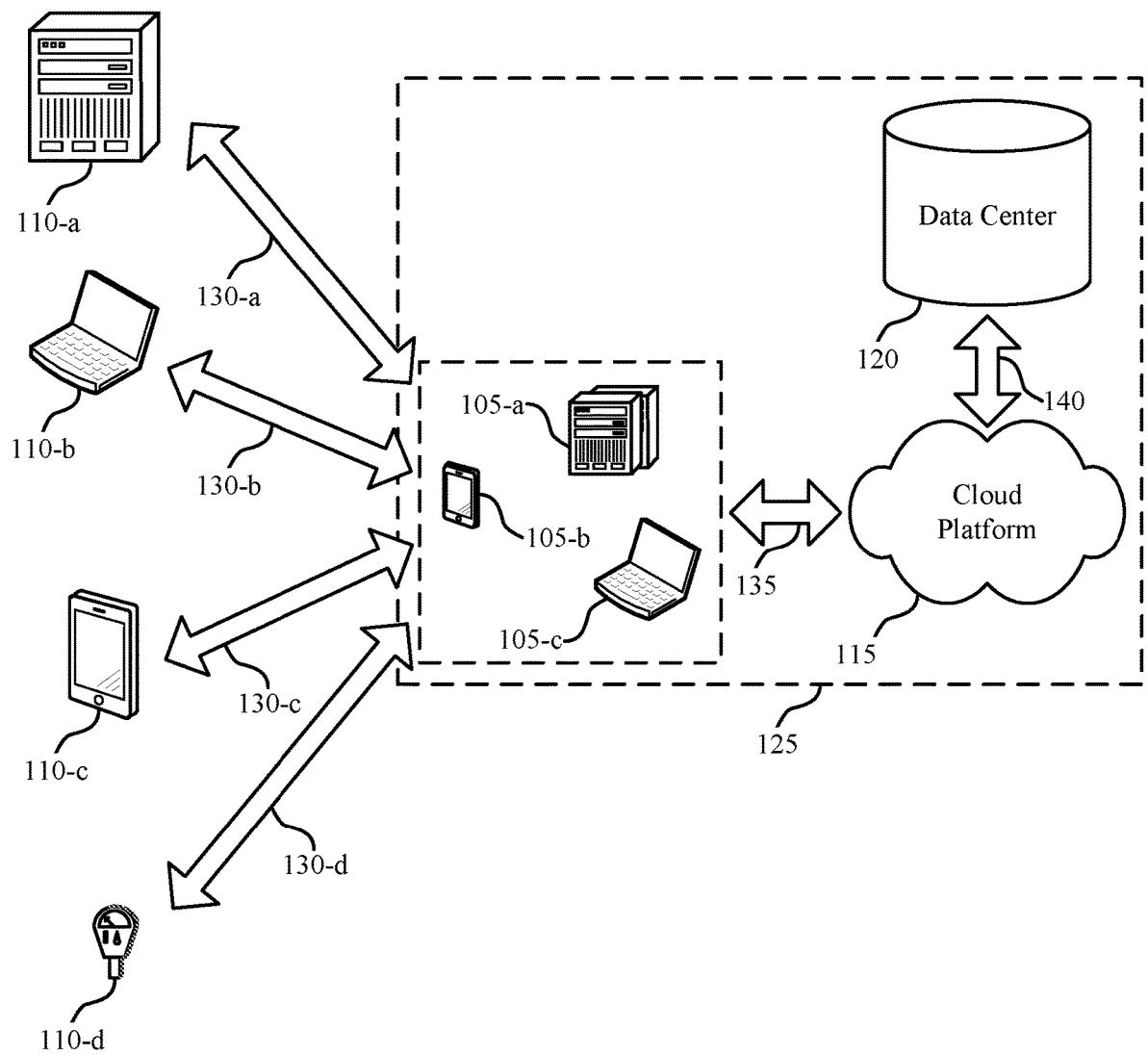
FIG. 1 illustrates an example of a data processing system that supports Automated C-Structure Introspection and Discovery (ACSID) in accordance with aspects of the present disclosure.

FIG. 1 illustrates an example of a system 100 for cloud computing that supports ACSID in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to some applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The techniques described herein enable a system to implement an ACSID procedure. The system, which may include ASP machinery, may run a set of ASP scripts on a program binary executable (e.g., a postgres binary) written in C-language, in some cases, without making changes to the source-code of a corresponding program. The system may generate a set of dictionary files indicating data structural information for the program binary executable, where the data structural information may describe the data structures and type systems in use by the program binary executable (e.g., a running C program). In some examples, the data structural information may be combined with an ASP library to generate an extended ASP library. In some examples, the ASP library may be used to perform introspection. For example, the ASP library may be used to perform type introspection, which may be used to examine the type or properties of its data structures at runtime. The system may augment the program binary executable with the extended ASP library to generate an augmented program binary executable such that the introspection capabilities of the ASP library may be applied to the program binary executable. Using the augmented program binary executable, at run-time, the system may programmatically perform an introspection procedure of member data structures to extract their data type and value and perform a data discovery procedure on a C-language program, in some cases, without making changes to the source-code of a corresponding program.

The approaches herein may be applied to any C-language program at build-time, which may reduce or eliminate the use of ASP-specific machinery to perform introspection and data discovery. Additionally, or alternatively, an ASP-generated set of dictionary files, and corresponding structural definition description (SDD) dictionaries, may be custom for the C-language program being processed. As such, the generated dictionary may be particular to that C-language program. In this way, the approaches herein provide general purpose software automation techniques and tooling, which may be applied and customized for any C-language program. For example, a user may perform an introspection and data discovery procedure on a C-language program, which may include examining, debugging, and printing data structures at run-time. Using introspection and data discovery, the user may enhance troubleshooting and debugging capabilities for that C-language program and develop a custom printing library for any running C-language program, among other enhancements. Thus, when the user performs trace operations or other analyses on the C-language program, the user may use an existing ASP machinery and ACSID procedure which may enable more efficient data processing and an improved user experience.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
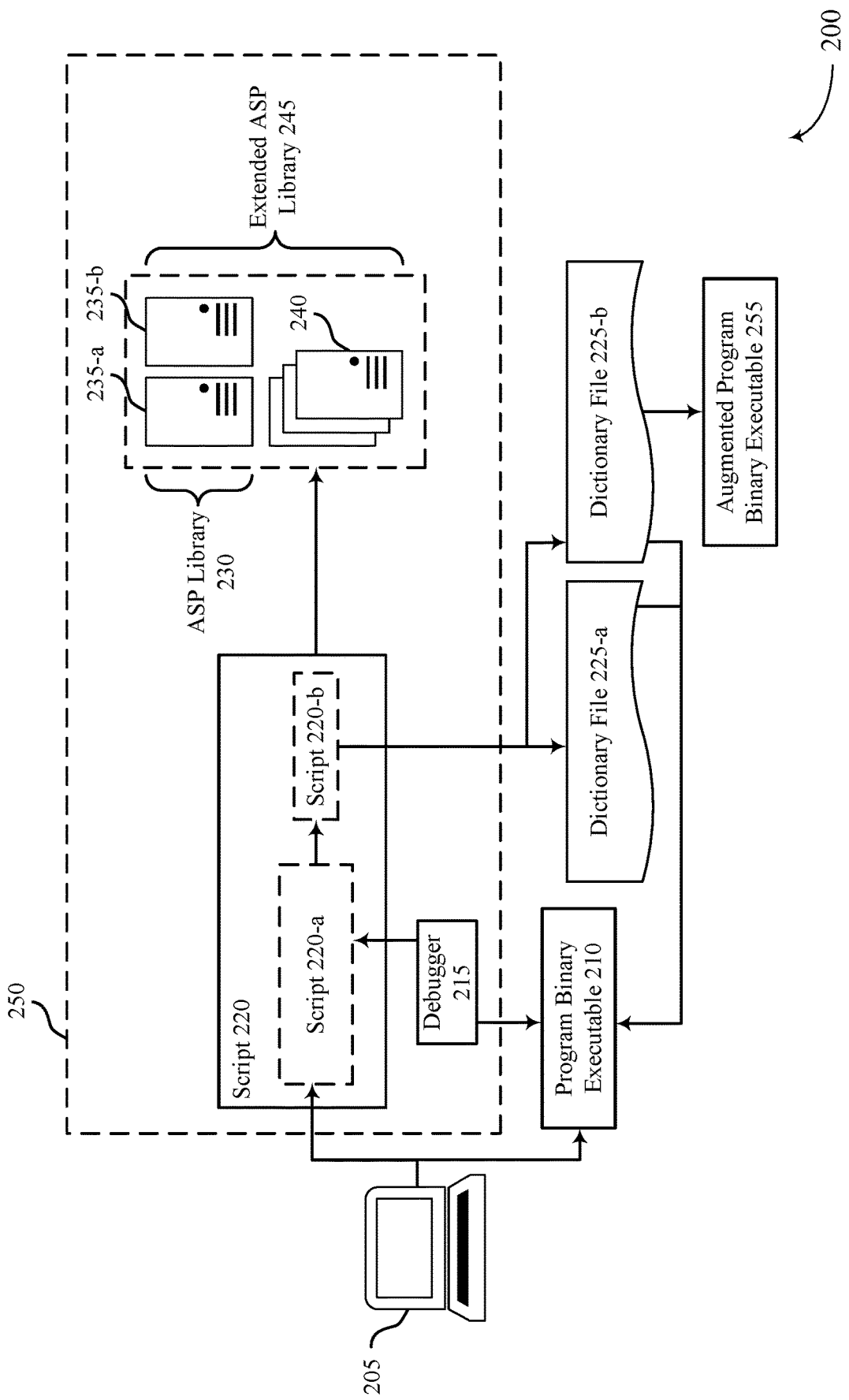
FIG. 2 illustrates an example of a system that supports ACSID in accordance with aspects of the present disclosure.

FIG. 2 illustrates an example of a system 200 that supports ACSID in accordance with aspects of the present disclosure. The system 200 may include a user 205, a program binary executable 210, dictionary files 225, and an augmented program binary executable 255. A debugger 215, scripts 220, an ASP library 230, and an extended ASP library 245 may perform one or more ACSID operations as part of the ACSID machinery 250. Though the approaches described herein may be described in examples where some elements of the system 200 perform some operations, it is to be understood that other elements of system 200 or other elements not shown in relation to system 200 may also perform operations described herein.

As described herein, the system 200, which may include ASP machinery, may enable an automated build-time capability to some C-language program to perform an ACSID procedure. The user 205 may implement the ASP machinery with the C-language program to construct internal structure definition tables, which may describe some data structures and type systems in use by the running C-language program. Using a library of information that may be linked into the program binary executable 210 at the build time, the ASP machinery may provide introspection application programming interfaces (APIs) which may be used to examine, debug, and print data structures at run-time. In some examples, the user 205 may use ASP to gather structure and type information from a C-language binary (e.g., the program binary executable 210), and to construct internal data structures to track the structure and type information. The structure and type information may be used as metadata (e.g., Binary Trace metadata) and structure-definition layouts (e.g., used to automate print methods for C-structures). In some examples, ASP may rely on debugging information that may be routinely packaged in a linked binary to develop structure definition tables which may drive introspection and data discovery capabilities.

In some examples, the user 205 may generate the program binary executable 210 (e.g., a postgres binary) written in C-language. The program binary executable 210 may be a metadata file associated with the C-language program, and may provide a database management system for storing binary data. In some examples, the user 205 may leverage the debugger 215 to extract information about the program binary executable 210, particularly regarding the C-language programming. In some cases, the debugger 215 may be a GNU debugger (e.g., a gdb) which may allow for debugging C-language programs during run-time.

The user 205 may run the one or more scripts 220 (e.g., an ASP script) on the program binary executable 210 (e.g., using standard C-compilation and build tools available in C-based program development environments, such as those build on top of a Gnu-Make program), which may be different software components used for ASP. The scripts 220 may include a top-level bash script (e.g., runAspGeneration.sh) included in a serviceability directory (e.g., serviceability/sub-dir), which may drive the ASP (e.g., the process of generating definition files including data type and structure definitions) using outputs generated from commands from the debugger 215. Additionally, or alternatively, the scripts 220 may include a Python script (e.g., sAutoGenAspStructDefns.py) which may process data type and structure definitions generated from commands from the debugger 215 to produce structure definition arrays. In some examples, the ASP may also include print methods on the engine-side which may use generated structure definition arrays to decode structure contents. Rather than writing specialized header and source file parsers which may build type definitions, a type system hierarchy, and a layout of structure definitions, the ASP may automatically leverage information that may be available indirectly in a symbol table generated as part of a C-program executable binary. That is, the ASP may be stand-alone tooling machinery that may automate the generation of an SDD. The information may be accessible through debugger 215 primitives as described herein.

In the example of FIG. 2, the one or more scripts 220 (e.g., generation scripts) may include a script 220-*a*, which may be a shell script (e.g., serviceability/runAspGeneration.sh), and a script 220-*b*, which may be a Python script (e.g., asp/main.py). Based on running the one or more scripts 220 on the program binary executable 210, the system 200 may generate a set of dictionary files 225 indicating data structural information for the program binary executable 210. For example, the script 220-*a* may use the functionalities of the debugger 215 to extract information about the program binary executable 210. The information may include a list of referenced C-structures, a name of each field in each of the referenced C-structures, a definition of each field (e.g., data type names, type definitions), other data type definitions compiled into the program binary executable 210, references to other nested sub-structures and other data type definitions, a layout of bit fields in structure fields, and enumerated type definitions (e.g., names and enumerated constant values). The dictionary files 225 may include a dictionary file 225-*a*, which may include data type information (e.g., sGenAspDataTypes.h) and a dictionary file 225-*b*, which may include structural definitions (e.g., sAspStructDefinitions.c).

ASP may include structure introspection, which may be driven by the dictionary file 225-*a* and the dictionary file 225-*b* (e.g., the .h and .c files). The dictionary files 225 may include a structure description layout and other information to unpack data structures in the program binary executable 210 (e.g., the running C-language program). The dictionary files 225 include information which may drive ASP and introspection. For example, in addition to the dictionary files 225, the scripts 220 may generate a set of internal structure definition tables including internal structure information as described herein. The set of internal structure definition tables may include SDD dictionaries for all data structures in the program binary executable 210. The SDD dictionaries may enable structure introspection by detailing the structure information of the program binary executable 210. For example, the user 205 may extend the scripts 220 to support Arvo-schema generation, and may introduce a configuration file (e.g., sAspTraceMetadataConfig.txt) to implement the Avro-schema, which may be similar to a configuration file used for Binary Trace schemas. For example, the user 205 may extend the scripts 220 to support automated print and automated generation of a diagnostics method, and the user 205 may introduce a configuration file (e.g., sAspStructDefnsConfig.txt) to implement the methods, which may be similar to a configuration file used for Binary Trace schemas. In some examples, the configuration file may be used to list C-structures of interest for introspection, troubleshooting, diagnostics, or any combination thereof. For example, the user 205 may list one or more C-structures the user 205 may desire to be included in the SDD. For any structure listed, all sub-structures nested under the structure, and all enumerated types and data type definitions in all nested structures may be expanded and included in the SDD. In this way, the user 205 may use a list of a few top-level structures, and may use ASP to generate the associated SDD details by working down the chain of nested structures.

In some examples, ASP may utilize a well-defined layout of field in a C-structure, the type of each field, and the type hierarchy (e.g., to resolve nested type definitions). This data structure (e.g., the SDD) may be a set of static arrays defining the layout of the structure which may be compiled with the SDB code. The ASP may include two components.

A build-time pre-processing component may include the scripts 220 provided to post-process outputs from commands from the debugger 215. The scripts 220 may run against the program binary executable 210, generate type information, structure layouts including field-offsets, or any combination thereof. Specifically, the build-time processing component may use commands from the debugger 215 such as "ptype/o," "whatis," and "info types," among other examples. For example, the script 220-*b* may parse the output from the gdb "ptype/o" command on known structures in the codebase to generate the structure definition static arrays. In some examples, to account for platform differences and build modes, the build-time processing component may run build-time processing scripts for each build mode separately.

The ASP may also include a run-time processing component. The run-time processing component may use provided generic print methods (e.g., printThis(void *addr), printThisAs(void *addr, const char *structName)). In some cases, the run-time processing component may open the fields of a structure by looking up the structure definition arrays and printing each field in some canonical format (e.g., "<fieldname>=<value>). The static arrays may locate the start-offset of each field, the data base type, and a data base length. Existing rich describe methods (e.g., printing in long-form opaque data items including internal Transaction-Commit Number, etc.) may be automatically invoked. When possible, hooks may be provided to call out to other user-specified print methods for improved diagnostics. In some examples, a user-specified print method may include a print command (e.g., printThis( )). In some cases, an interface may provide limited support for decoding and printing those structures whose identities may be established by respective start addresses. Additionally, or alternatively, printing to stdout (e.g., regular printf( )) and to error log files using e log(LOG)) interfaces may be supported. In some cases, describe strings may be built for integration (e.g., with StringInfo interfaces).

ASP may provide the user 205 with a print (e.g., a description) of a layout of the C-structures in an SDB code base. The ASP may be used to generate rich print outputs for the inside of structures, such as printing enumerated values (e.g., enum-values) as their mnemonics. Generic print methods provided in a running server may invoke the SDD metadata to generate print outputs. The print capability may be integrated (e.g., under debugging or monitoring tools) for decoding structures found in shared segments. Using ASP, canonical print outputs may be rendered for C-structures without writing a describe method for each new C-structure added to the codebase.

In some examples, the data structural information from the set of dictionary files 225 may be combined with the ASP library 230 to generate an extended ASP library 245, which may include a file 235-*a*, a file 235-*b*, or one or more additional files associated with the ASP library 230 and the data structural information 240 from the set of dictionary files 225. For example, the script 220-*b* may combine the data structural information 240 (e.g., sAspPrint.c) with a file 235-*a* (e.g., sAspApi.h) and a file 235-*b* (e.g., sAspApi.c) into tables for introspection. The ASP library 230 (e.g., an ASP-API library) may include methods that may describe the data structures and type systems in the program binary executable 210, developing the introspection capability in the running C-language program. For example, the ASP and the ASP library 230 may be deployed to generate a specification of data (e.g., Avro-schema specification of Binary Telemetry Trace data), to develop a custom printing library for the running C-language program (e.g., or some running software), for enhanced troubleshooting and debugging, or a combination thereof.

In some examples, the script 220-*a* (e.g., a bash script, runAspGeneration.sh) may drive the process to generate the C-structure definition and type system hierarchy. The script 220-*a* may drive the process in multiple stages including running a debugger 215 command, post-processing the output to generate debugger 215 sub-command files, executing the generated files through the debugger 215, and inputting a set of output files from the debugger 215 to the script 220-*b* to generate the structure definition tables. The output files may include a generated file which may hold the structure definition static arrays (e.g., structDefinitions.c) and an associated header file (e.g., structDefinitions.h).

In some cases, the script 220-*a* may first run a debugger 215 command (e.g., "info types") to generate a full listing of the type definitions, enumerated types, and structures defined in the program binary executable 210. The system 200 may save this output in a file (e.g., gdb.types.out). In some examples, the script 220-*a* may then filter the file (e.g., gdb.types.out) for structure definitions and enumerated type definitions. For example, for structure definitions, the script 220-*a* may generate a file of commands from the debugger 215 (e.g., gdb.ptypes.cmds) with the "ptype/o"<structName>" command. The command may generate the structure layout, a start offset, and a length of each field. The output may be formatted such that it may be amenable for parsing using other tools. For enumerated types, the script 220-*a* may generate a file of commands from the debugger 215 (e.g., gdb.enumtypes.cmds) with a command (e.g., a "ptype/o"<enumTypeName>" command). The command may generate the enumerated value tokens for the enumerated type. The output file may be a full collection of one or more enumerated type definitions, which may be used to auto-generate enumerated type names static arrays. Additionally, or alternatively, the script 220-*a* may use the "ptype/o" command for union typedefs.

The script 220-*a* may run the debugger 215 on the generated command files and may capture the output to other temporary (e.g., tmp) files (e.g., gdb postgres<gdb.ptypes.cmds>gbd.ptypes.cmds.out, gdb postgres<gdb.enumtypes.cmds>gdb.enumtypes.cmds.out).

In some examples, the script 220-*a* may feed the output files to a script (e.g., sAutoGenAspStructDefns.py), where the user 205 may map each type definition to a generated type-ID to resolve the type system hierarchy and iteratively process structure definitions (e.g., found in gdb.ptypes.cmds.out) until all field names and the corresponding type definitions may be fully resolved. The output files used for the mapping may include an output file used to resolve the type definition hierarchy (e.g., gdb.types.out), an output file used to resolve structure layout the typedefs of each field (e.g., gdb.ptypes.cmds.out), and an output file to resolve the enumerated typedefs and mnemonics (e.g., gdb.enumtypes.cmds.out). After receiving, parsing, and post-processing the input files, the user 205 may receive the structure definition static arrays which may provide a list of field names, a start offset, a length, and a data type of each field. The structure definition static arrays may be compiled into a binary of the user 205 that the scripts 220 may originally process.

The ACSID machinery 250 including the debugger 215, the scripts 220, the ASP library 230, and the extended ASP library 245 may be implemented by an augmented program binary executable 255. For example, the system 200 may augment the program binary executable 210 with the extended ASP library 245 to generate the augmented program binary executable 255. That is, the system 200 may relink the dictionary files 225 with the program binary executable 210 (e.g., the existing program binary executable) to produce an intelligent binary with extended information. As such, the C-language program augmented with additional information generated using ASP may enable introspection and data discovery procedures, among other applications associated with the C-language program. The user 205 may then perform an introspection and data discovery procedure on the C-language program using the augmented program binary executable 255. Additionally, or alternatively, the system may print an output for the user 205 based on the introspection and data discovery procedure. In some examples, the augmented program binary executable 255 may be generated at a build-time associated with the C-language program, and the introspection and data discovery procedure may be performed dynamically at a run-time associated with the C-language program.

As described herein, the ACSID machinery 250 (e.g., and associated software automation and tooling) may be general purpose and therefore, may be applied to any C-language program at build-time. As such, during a build-mode, debugging information may be compiled into the program binary executable 210, which the ASP may then inspect, gather, and extract to construct the SDD tables. ASP-generated SDD tables may be custom for the binary program being processed, and thus the generated dictionary may likewise be particular to that binary program. As such, the system may refrain from using any ASP-specific features to build an SDD table. In some examples, after the ASP may have constructed the SDD which may be linked back into the program binary executable 210, the user 205 may return to using a version of the program binary executable 210 without debug information built into it. That is, the program binary executable 210 may refrain from revealing debugging information and therefore being exposed, even while the ASP-generated SDD may be used for run-time introspection and other examples.

In some cases, the structure definition arrays may be implemented for different printing APIs, for example, to handle segmentation faults and to address illegal address access, among other examples. In some cases, a return code indicating the type of error encountered, with an informational message, may be returned (e.g., by the debugger 215) for cases in which the inputs may be intractable. In some examples, the system 200 may support extended print interfaces to support different print options, print formats, and in some cases, to identify and print nested structures. In some cases, most of the print APIs may be supported by a common-use printing driver which may describe the fields of the structure in a user-supplied stream (e.g., StringInfo stream).

In some cases, ASP may be used to support binary trace metadata. For binary trace metadata, the user 205 may be concerned with a small list of structures, and as such may desire to filter the SDD generation procedure to this small list of trace-related structures. As such, the ASP machinery may customize some generated outputs, and a desired output may be in Avro schema files (e.g., one per C-structure) in some known output directory. In some examples, the script 220-b (e.g., the Python script used to combine the ASP library 230 and the data structural information 240) may generate the trace metadata in an Avro schema format. For example, the list of structures for which the metadata may be generated may be sourced from a trace configuration file (e.g., postgressql/src/codegen/asp/sAspTraceMetadata.txt).

The Avro schema files may be generated in a sub-directory, and a collection of the output files (e.g., one per C-structure processed) may be generated in the sub-directory. The collection of generated output files may be transmitted to downstream consumers of the trace metadata information.

Figure 3:
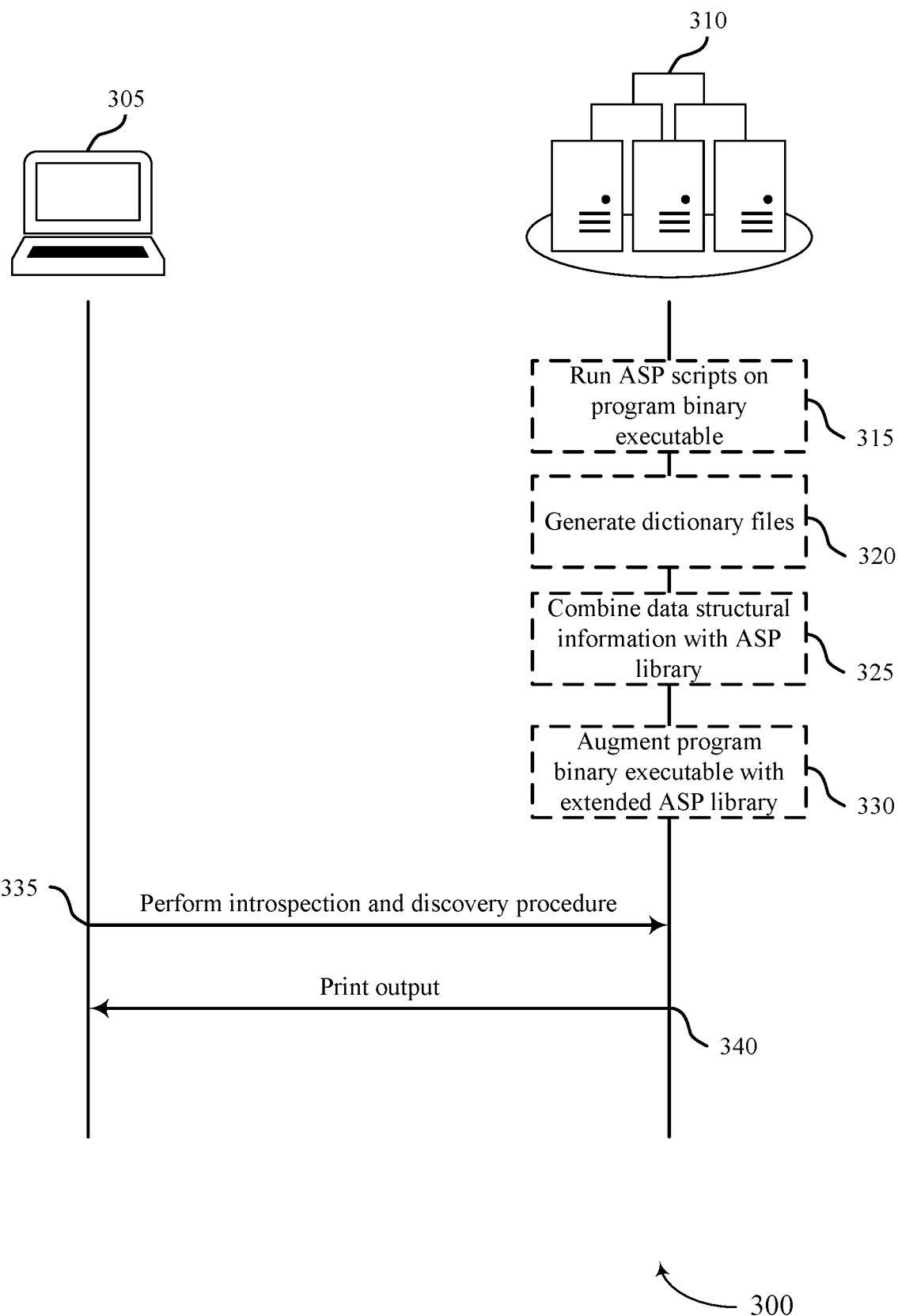
FIG. 3 illustrates an example of a process flow that supports ACSID in accordance with aspects of the present disclosure.

FIG. 3 illustrates an example of a process flow 300 that supports ACSID in accordance with aspects of the present disclosure. The process flow 300 may implement aspects of system 200, or may be implemented by aspects of the system 200. The process flow 300 may include a user 305 and ASP machinery 310. In the following description of the process flow 300, the operations between the user 305 and the ASP machinery 310 may be performed in different orders or at different times. Some operations may also be left out of the process flow 300, or other operations may be added. Although the user 305 and the ASP machinery 310 are shown performing the operations of the process flow 300, some aspects of some operations may also be performed by one or more other devices, or may be performed by other devices included in the process flow.

At 315, the ASP machinery 310 (e.g., which may be a component of ACSID machinery) may run a set of ASP scripts on a program binary executable written in C-language, in some cases, without making changes to the source-code of a corresponding program. In some examples, running the set of ASP scripts on the program binary executable may include running a debugging program to extract structural information compiled in the program binary executable.

At 320, the ASP machinery 310 may generate a set of dictionary files indicating data structural information for the program binary executable based on running the set of ASP scripts on the program binary executable. The data structural information may include a list of C-structures referenced, names of fields in the C-structures, definitions of individual fields including data type names and data type definitions, additional data type definitions compiled in the program binary executable, references to nested sub-structures, layouts of bit fields in structured fields, enumerated type definitions including names and enumerated constant values, or any combination thereof. In some cases, the ASP machinery 310 may generate a set of internal structure definition tables, where the set of internal structure definition tables may include SDD dictionaries for all data structures in the program binary executable. For example, the ASP machinery 310 may execute a first shell script of the set of ASP scripts to generate a set of intermediate files indicating the data structural information, and execute a second table generation script to generate the set of internal structure definition tables using the set of intermediate files.

At 325, the ASP machinery 310 may combine the data structural information from the set of dictionary files with an ASP library to generate an extended ASP library. At 330, the ASP machinery 310 may augment the program binary executable with the extended ASP library to generate an augmented program binary executable. In some examples, the augmented program binary executable may be generated at build-time associated with the C-language program.

At 335, the user 305 may use the ASP machinery 310 to perform an introspection and data discovery procedure on the C-language program using the augmented program binary executable. For example, using the augmented program binary executable, at run-time, the system may programmatically perform an introspection procedure of member data structures to extract their data type and value and perform a data discovery procedure on a C-language program, in some cases, without making changes to the source-code of a corresponding program. In some examples, the ASP machinery 310 may perform the introspection and data discovery procedure at a run-time associated with the C-language program. At 340, the ASP machinery 310 may print an output associated with the introspection and data discovery procedure for the user 305. Additionally, or alternatively, the ASP machinery 310 may print data structures of the C-language program, examine the C-language program, debug the C-language program, perform trace operations on the C-language program, or any combination thereof. In some examples, the ASP machinery 310 may execute an ASP API, where the ASP API may support querying the structural information of the C-language program, generating a catalog of field descriptions, structure layout, and enumerated type information of the C-language program, or any combination thereof.

Figure 4:
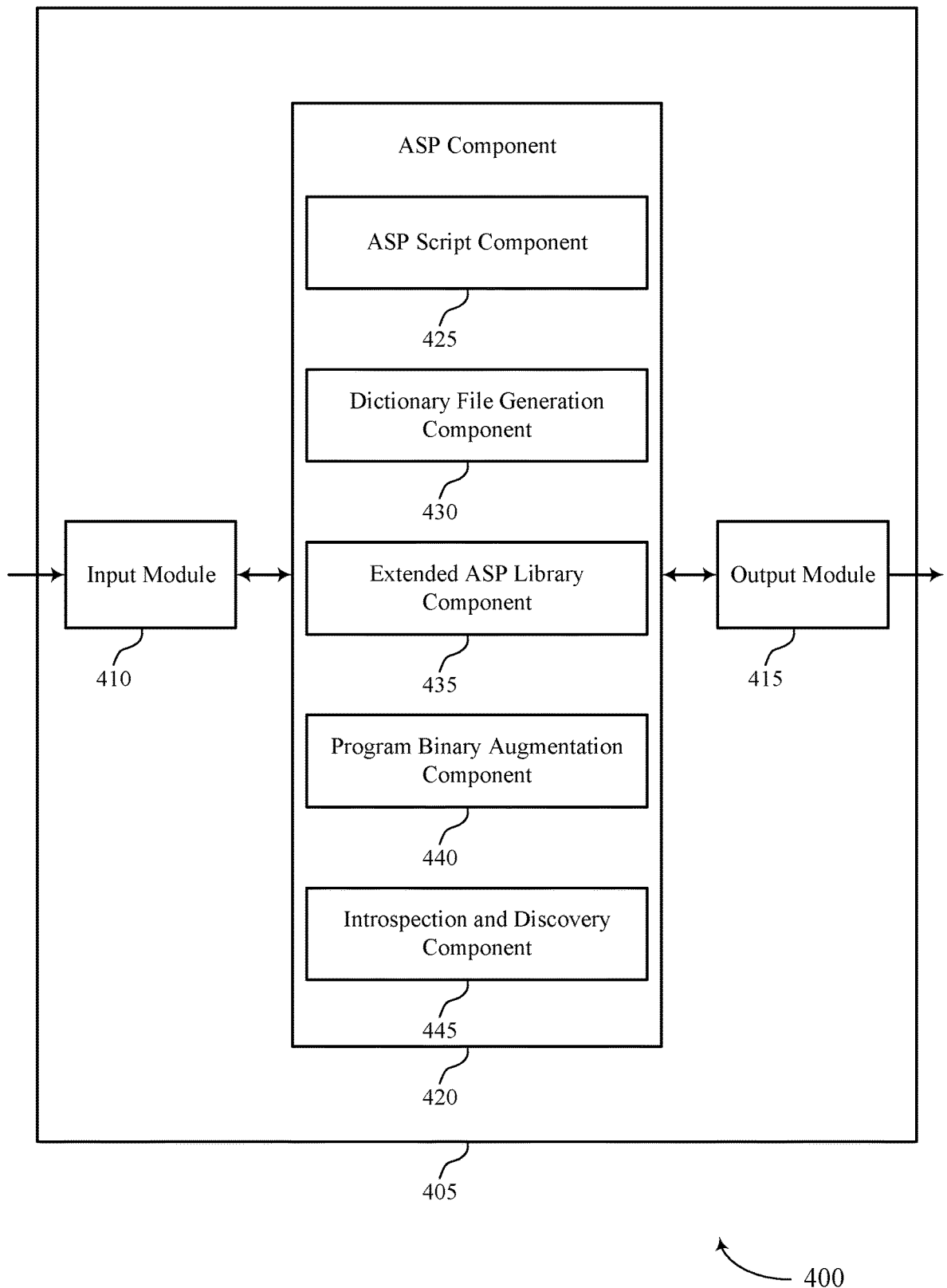
FIG. 4 shows a block diagram of an apparatus that supports ACSID in accordance with aspects of the present disclosure.

FIG. 4 shows a block diagram 400 of a device 405 that supports ACSID (e.g., a computing device running or otherwise supporting ACSID machinery) in accordance with aspects of the present disclosure. The device 405 may include an input module 410, an output module 415, and an ASP component 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the ASP component 420 to support ACSID. In some cases, the input module 410 may be a component of an I/O controller 610 as described with reference to FIG. 6.

The output module 415 may manage output signals for the device 405. For example, the output module 415 may receive signals from other components of the device 405, such as the ASP component 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the ASP component 420 may include an ASP script component 425, a dictionary file generation component 430, an extended ASP library component 435, a program binary augmentation component 440, an introspection and discovery component 445, or any combination thereof. In some examples, the ASP component 420, or various components thereof, may be configured to perform various operations (e.g., receiving, monitoring, transmitting) using or otherwise in cooperation with the input module 410, the output module 415, or both. For example, the ASP component 420 may receive information from the input module 410, send information to the output module 415, or be integrated in combination with the input module 410, the output module 415, or both to receive information, transmit information, or perform various other operations as described herein.

The ASP component 420 may support data processing in accordance with examples as disclosed herein. The ASP script component 425 may be configured as or otherwise support a means for running a set of ASP scripts on a program binary executable written in C-language. The dictionary file generation component 430 may be configured as or otherwise support a means for generating a set of dictionary files indicating data structural information for the program binary executable based at least in part on running the set of ASP scripts on the program binary executable. The extended ASP library component 435 may be configured as or otherwise support a means for combining the data structural information from the set of dictionary files with an ASP library to generate an extended ASP library. The program binary augmentation component 440 may be configured as or otherwise support a means for augmenting the program binary executable with the extended ASP library to generate an augmented program binary executable. The introspection and discovery component 445 may be configured as or otherwise support a means for performing an introspection and data discovery procedure on a C-language program using the augmented program binary executable.

Figure 5:
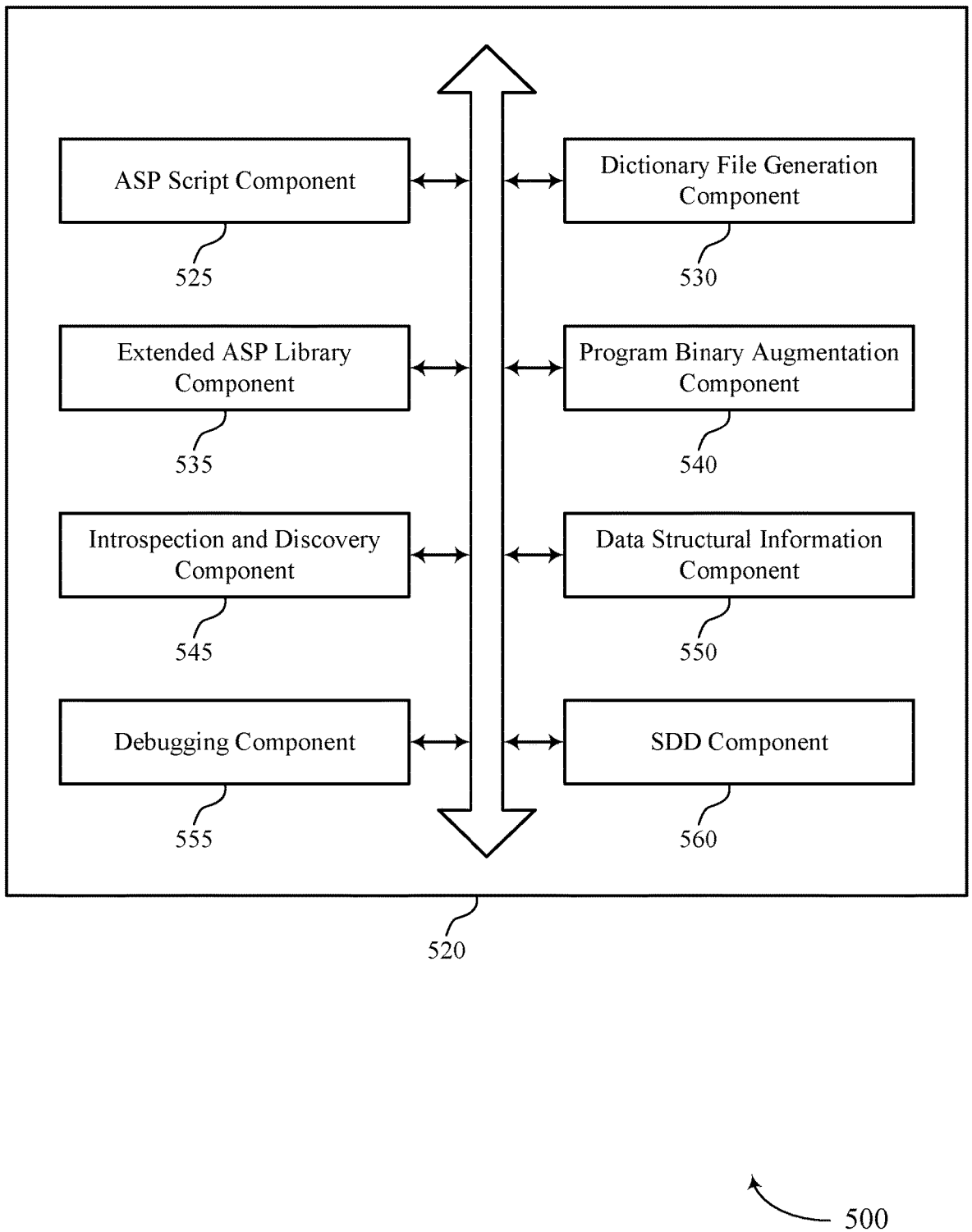
FIG. 5 shows a block diagram of a system that supports ACSID in accordance with aspects of the present disclosure.

FIG. 5 shows a block diagram 500 of an ASP component 520 that supports ACSID in accordance with aspects of the present disclosure. The ASP component 520 may be an example of aspects of an ASP component 420, as described herein. The ASP component 520, or various components thereof, may be an example of means for performing various aspects of ACSID as described herein. For example, the ASP component 520 may include an ASP script component 525, a dictionary file generation component 530, an extended ASP library component 535, a program binary augmentation component 540, an introspection and discovery component 545, a data structural information component 550, a debugging component 555, an SDD component 560, or any combination thereof. Each of these components may communicate, directly or indirectly, with one another (e.g., via one or more buses).

The ASP component 520 may support data processing in accordance with examples as disclosed herein. The ASP script component 525 may be configured as or otherwise support a means for running a set of ASP scripts on a program binary executable written in C-language. The dictionary file generation component 530 may be configured as or otherwise support a means for generating a set of dictionary files indicating data structural information for the program binary executable based at least in part on running the set of ASP scripts on the program binary executable. The extended ASP library component 535 may be configured as or otherwise support a means for combining the data structural information from the set of dictionary files with an ASP library to generate an extended ASP library. The program binary augmentation component 540 may be configured as or otherwise support a means for augmenting the program binary executable with the extended ASP library to generate an augmented program binary executable. The introspection and discovery component 545 may be configured as or otherwise support a means for performing an introspection and data discovery procedure on a C-language program using the augmented program binary executable.

In some examples, to support generating the set of dictionary files, the data structural information component 550 may be configured as or otherwise support a means for identifying the data structural information of the program binary executable, wherein the data structural information comprises a list of C-structures referenced, names of fields in the C-structures, definitions of individual fields including data type names and data type definitions, additional data type definitions compiled in the program binary executable, references to nested sub-structures, layouts of bit fields in structured fields, enumerated type definitions including names and enumerated constant values, or any combination thereof.

In some examples, to support generating the set of dictionary files, the data structural information component 550 may be configured as or otherwise support a means for generating a set of internal structure definition tables. In some examples, the set of internal structure definition tables comprise structural definition description (SDD) dictionaries for all data structures in the program binary executable.

In some examples, to support generating the set of internal structure definition tables, the data structural information component 550 may be configured as or otherwise support a means for executing a first shell script of the set of ASP scripts to generate a set of intermediate files indicating the data structural information. In some examples, to support generating the set of internal structure definition tables, the data structural information component 550 may be configured as or otherwise support a means for executing a second table generation script to generate the set of internal structure definition tables using the set of intermediate files.

In some examples, the augmented program binary executable is generated at a build-time associated with the C-language program, and wherein the introspection and data discovery procedure is performed dynamically at a run-time associated with the C-language program.

In some examples, the introspection and discovery component 545 may be configured as or otherwise support a means for performing the introspection and data discovery procedure on the C-language program comprises printing data structures of the C-language program, examining the C-language program, debugging the C-language program, performing trace operations on the C-language program, or any combination thereof.

In some examples, the introspection and discovery component 545 may be configured as or otherwise support a means for performing the introspection and data discovery procedure on the C-language program comprises executing an ASP API, wherein the ASP API supports querying the data structural information of the C-language program, generating a catalog of field descriptions, structure layout, and enumerated type information of the C-language program, or any combination thereof.

In some examples, the debugging component 555 may be configured as or otherwise support a means for running the set of ASP scripts on the program binary executable comprises running a debugging program to extract structural information compiled in the program binary executable.

Figure 6:
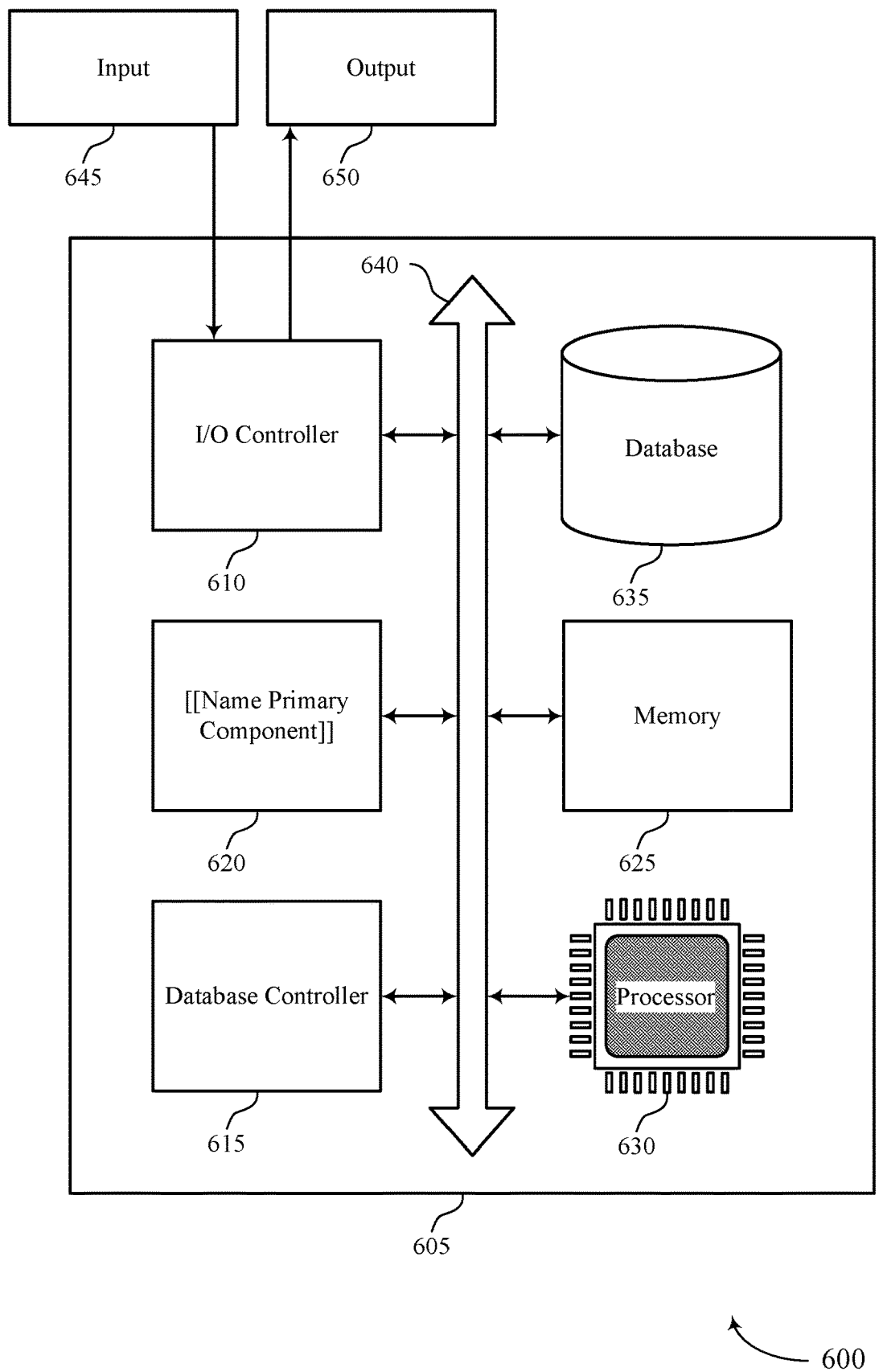
FIG. 6 shows a diagram of a system including a device that supports ACSID in accordance with aspects of the present disclosure.

FIG. 6 shows a diagram of a system 600 including a device 605 that supports ACSID in accordance with aspects of the present disclosure. The device 605 may be an example of or include the components of a device 405 as described herein. The device 605 may include components for bi-directional data communications including components for transmitting and receiving communications, such as an ASP component 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a digital signal processor (DSP), a central processing unit (CPU), a microcontroller, an ASIC, a field programmable gate array (FPGA), a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting ACSID).

The ASP component 620 may support data processing in accordance with examples as disclosed herein. For example, the ASP component 620 may be configured as or otherwise support a means for running a set of ASP scripts on a program binary executable written in C-language. The ASP component 620 may be configured as or otherwise support a means for generating a set of dictionary files indicating data structural information for the program binary executable based at least in part on running the set of ASP scripts on the program binary executable. The ASP component 620 may be configured as or otherwise support a means for combining the data structural information from the set of dictionary files with an ASP library to generate an extended ASP library. The ASP component 620 may be configured as or otherwise support a means for augmenting the program binary executable with the extended ASP library to generate an augmented program binary executable. The ASP component 620 may be configured as or otherwise support a means for performing an introspection and data discovery procedure on a C-language program using the augmented program binary executable.

By including or configuring the ASP component 620 in accordance with examples as described herein, the device 605 may support techniques for ACSID procedures, which may improve user experience related to reduced processing and improved utilization of processing capability.

Figure 7:
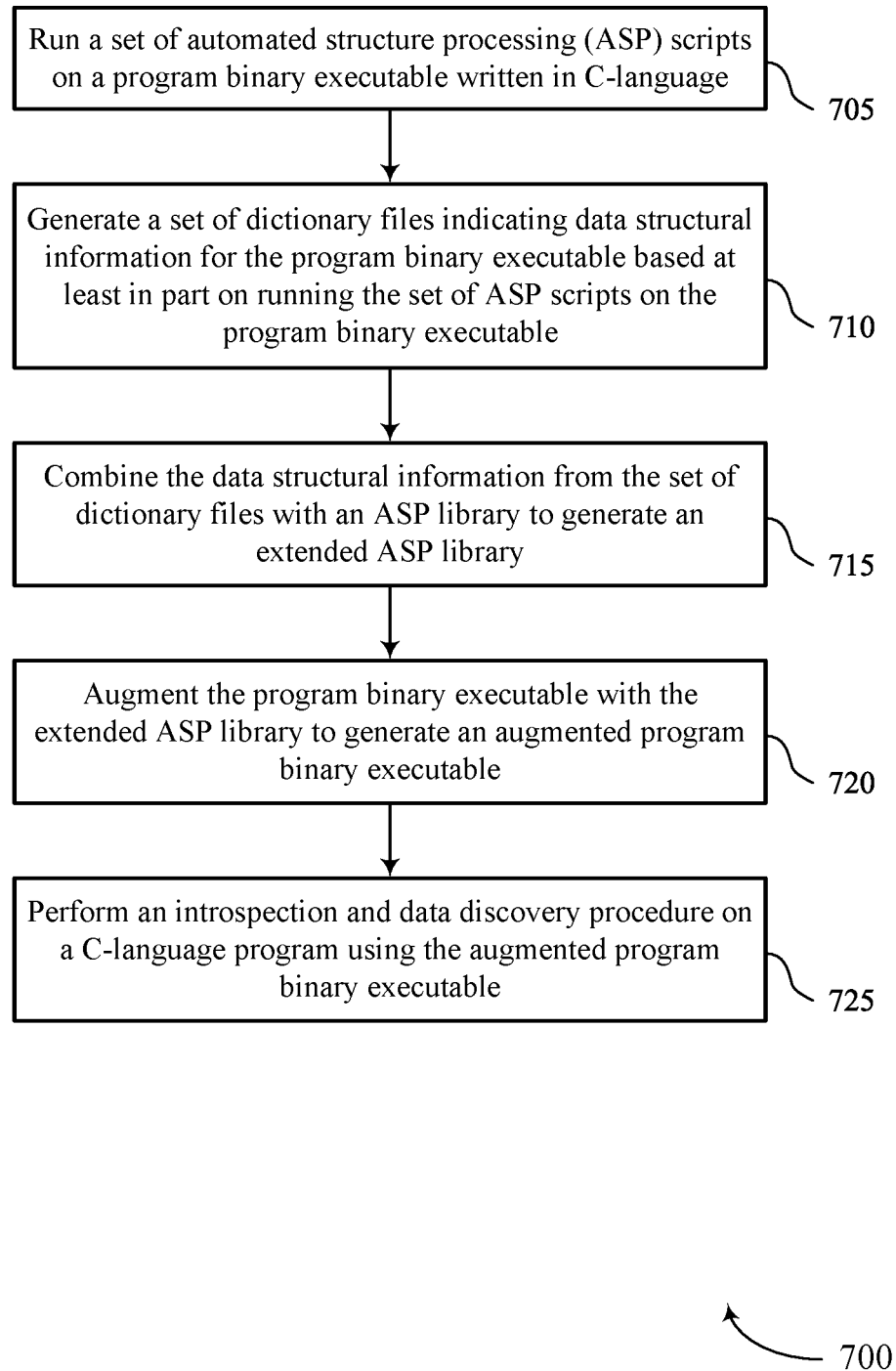
FIGS. 7 and 8 show flowcharts illustrating methods that support ACSID in accordance with aspects of the present disclosure.

FIG. 7 shows a flowchart illustrating a method 700 that supports ACSID in accordance with aspects of the present disclosure. The operations of the method 700 may be implemented by a computing device such as ACSID machinery or its components as described herein. For example, the operations of the method 700 may be performed by a computing device supporting ACSID machinery as described with reference to FIGS. 1 through 6. In some examples, a computing device supporting ACSID machinery may execute a set of instructions to control the functional elements of the computing device to perform the described functions. Additionally, or alternatively, the computing device supporting ACSID machinery may perform aspects of the described functions using special-purpose hardware.

At 705, the method may include running a set of ASP scripts on a program binary executable written in C-language. The operations of 705 may be performed in accordance with examples as disclosed herein. In some examples, aspects of the operations of 705 may be performed by an ASP script component 525 as described with reference to FIG. 5.

At 710, the method may include generating a set of dictionary files indicating data structural information for the program binary executable based at least in part on running the set of ASP scripts on the program binary executable. The operations of 710 may be performed in accordance with examples as disclosed herein. In some examples, aspects of the operations of 710 may be performed by a dictionary file generation component 530 as described with reference to FIG. 5.

At 715, the method may include combining the data structural information from the set of dictionary files with an ASP library to generate an extended ASP library. The operations of 715 may be performed in accordance with examples as disclosed herein. In some examples, aspects of the operations of 715 may be performed by an extended ASP library component 535 as described with reference to FIG. 5.

At 720, the method may include augmenting the program binary executable with the extended ASP library to generate an augmented program binary executable. The operations of 720 may be performed in accordance with examples as disclosed herein. In some examples, aspects of the operations of 720 may be performed by a program binary augmentation component 540 as described with reference to FIG. 5.

At 725, the method may include performing an introspection and data discovery procedure on a C-language program using the augmented program binary executable. The operations of 725 may be performed in accordance with examples as disclosed herein. In some examples, aspects of the operations of 725 may be performed by an introspection and discovery component 545 as described with reference to FIG. 5.

Figure 8:
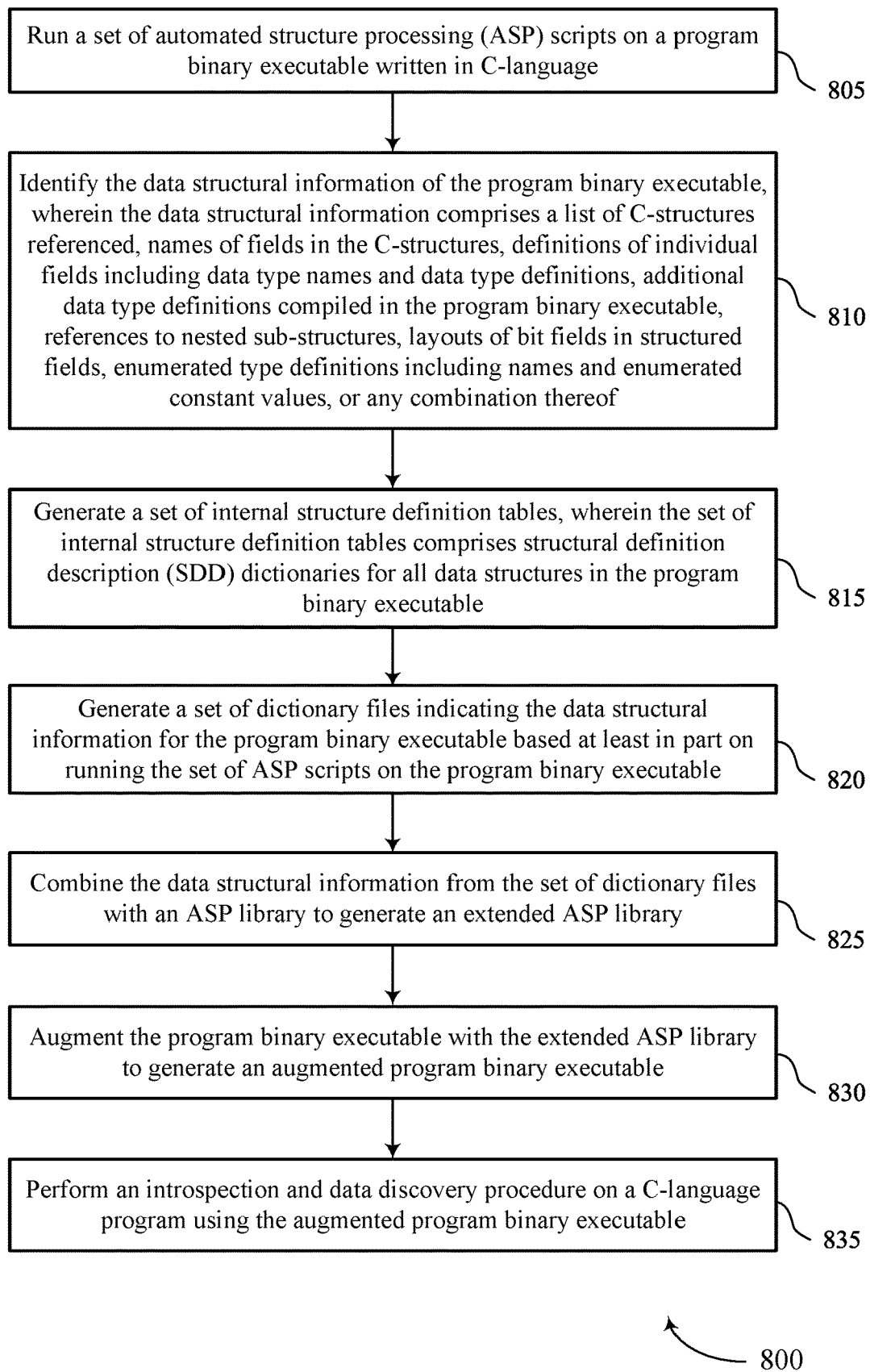

FIG. 8 shows a flowchart illustrating a method 800 that supports ACSID in accordance with aspects of the present disclosure. The operations of the method 800 may be implemented by a computing device supporting ACSID machinery or its components as described herein. For example, the operations of the method 800 may be performed by a computing device supporting ACSID machinery as described with reference to FIGS. 1 through 6. In some examples, a computing device supporting ACSID machinery may execute a set of instructions to control the functional elements of the computing device to perform the described functions. Additionally, or alternatively, the computing device supporting ACSID machinery may perform aspects of the described functions using special-purpose hardware.

At 805, the method may include running a set of ASP scripts on a program binary executable written in C-language. The operations of 805 may be performed in accordance with examples as disclosed herein. In some examples, aspects of the operations of 805 may be performed by an ASP script component 525 as described with reference to FIG. 5.

At 810, the method may include identifying the data structural information of the program binary executable, wherein the data structural information comprises a list of C-structures referenced, names of fields in the C-structures, definitions of individual fields including data type names and data type definitions, additional data type definitions compiled in the program binary executable, references to nested sub-structures, layouts of bit fields in structured fields, enumerated type definitions including names and enumerated constant values, or any combination thereof. The operations of 810 may be performed in accordance with examples as disclosed herein. In some examples, aspects of the operations of 810 may be performed by a data structural information component 550 as described with reference to FIG. 5.

At 815, the method may include generating a set of internal structure definition tables, wherein the set of internal structure definition tables comprises SDD dictionaries for all data structures in the program binary executable. The operations of 815 may be performed in accordance with examples as disclosed herein. In some examples, aspects of the operations of 815 may be performed by a data structural information component 550 as described with reference to FIG. 5.

At 820, the method may include generating a set of dictionary files indicating the data structural information for the program binary executable based at least in part on running the set of ASP scripts on the program binary executable. The operations of 820 may be performed in accordance with examples as disclosed herein. In some examples, aspects of the operations of 820 may be performed by a dictionary file generation component 530 as described with reference to FIG. 5.

At 825, the method may include combining the data structural information from the set of dictionary files with an ASP library to generate an extended ASP library. The operations of 825 may be performed in accordance with examples as disclosed herein. In some examples, aspects of the operations of 825 may be performed by an extended ASP library component 535 as described with reference to FIG. 5.

At 830, the method may include augmenting the program binary executable with the extended ASP library to generate an augmented program binary executable. The operations of 830 may be performed in accordance with examples as disclosed herein. In some examples, aspects of the operations of 830 may be performed by a program binary augmentation component 540 as described with reference to FIG. 5.

At 835, the method may include performing an introspection and data discovery procedure on a C-language program using the augmented program binary executable. The operations of 835 may be performed in accordance with examples as disclosed herein. In some examples, aspects of the operations of 835 may be performed by an introspection and discovery component 545 as described with reference to FIG. 5.

A method for data processing is described. The method may include running a set of ASP scripts on a program binary executable written in C-language, generating a set of dictionary files indicating data structural information for the program binary executable based at least in part on running the set of ASP scripts on the program binary executable, combining the data structural information from the set of dictionary files with an ASP library to generate an extended ASP library, augmenting the program binary executable with the extended ASP library to generate an augmented program binary executable, and performing an introspection and data discovery procedure on a C-language program using the augmented program binary executable.

An apparatus for data processing is described. The apparatus may include a processor, memory coupled with the processor, and instructions stored in the memory. The instructions may be executable by the processor to cause the apparatus to run a set of ASP scripts on a program binary executable written in C-language, generate a set of dictionary files indicating data structural information for the program binary executable based at least in part on running the set of ASP scripts on the program binary executable, combine the data structural information from the set of dictionary files with an ASP library to generate an extended ASP library, augment the program binary executable with the extended ASP library to generate an augmented program binary executable, and perform an introspection and data discovery procedure on a C-language program using the augmented program binary executable.

Another apparatus for data processing is described. The apparatus may include means for running a set of ASP scripts on a program binary executable written in C-language, means for generating a set of dictionary files indicating data structural information for the program binary executable based at least in part on running the set of ASP scripts on the program binary executable, means for combining the data structural information from the set of dictionary files with an ASP library to generate an extended ASP library, means for augmenting the program binary executable with the extended ASP library to generate an augmented program binary executable, and means for performing an introspection and data discovery procedure on a C-language program using the augmented program binary executable.

A non-transitory computer-readable medium storing code for data processing is described. The code may include instructions executable by a processor to run a set of ASP scripts on a program binary executable written in C-language, generate a set of dictionary files indicating data structural information for the program binary executable based at least in part on running the set of ASP scripts on the program binary executable, combine the data structural information from the set of dictionary files with an ASP library to generate an extended ASP library, augment the program binary executable with the extended ASP library to generate an augmented program binary executable, and perform an introspection and data discovery procedure on a C-language program using the augmented program binary executable.

In some examples of the method, apparatuses, and non-transitory computer-readable medium described herein, generating the set of dictionary files may include operations, features, means, or instructions for identifying the data structural information of the program binary executable, wherein the data structural information comprises a list of C-structures referenced, names of fields in the C-structures, definitions of individual fields including data type names and data type definitions, additional data type definitions compiled in the program binary executable, references to nested sub-structures, layouts of bit fields in structured fields, enumerated type definitions including names and enumerated constant values, or any combination thereof.

In some examples of the method, apparatuses, and non-transitory computer-readable medium described herein, generating the set of dictionary files may include operations, features, means, or instructions for generating a set of internal structure definition tables.

In some examples of the method, apparatuses, and non-transitory computer-readable medium described herein, the set of internal structure definition tables comprise structural definition description (SDD) dictionaries for all data structures in the program binary executable.

In some examples of the method, apparatuses, and non-transitory computer-readable medium described herein, generating the set of internal structure definition tables may include operations, features, means, or instructions for executing a first shell script of the set of ASP scripts to generate a set of intermediate files indicating the data structural information and executing a second table generation script to generate the set of internal structure definition tables using the set of intermediate files.

In some examples of the method, apparatuses, and non-transitory computer-readable medium described herein, the augmented program binary executable may be generated at a build-time associated with the C-language program, and wherein the introspection and data discovery procedure may be performed dynamically at a run-time associated with the C-language program.

Some examples of the method, apparatuses, and non-transitory computer-readable medium described herein may further include operations, features, means, or instructions for performing the introspection and data discovery procedure on the C-language program comprises printing data structures of the C-language program, examining the C-language program, debugging the C-language program, performing trace operations on the C-language program, or any combination thereof.

Some examples of the method, apparatuses, and non-transitory computer-readable medium described herein may further include operations, features, means, or instructions for performing the introspection and data discovery procedure on the C-language program comprises executing an ASP API, wherein the ASP API supports querying the data structural information of the C-language program, generating a catalog of field descriptions, structure layout, and enumerated type information of the C-language program, or any combination thereof.

Some examples of the method, apparatuses, and non-transitory computer-readable medium described herein may further include operations, features, means, or instructions for running the set of ASP scripts on the program binary executable comprises running a debugging program to extract structural information compiled in the program binary executable.

It should be noted that the methods described above describe possible implementations, and that the operations and the steps may be rearranged or otherwise modified and that other implementations are possible. Further, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
   running a set of automated structure processing (ASP) scripts on a program binary executable written in C programming language (C-language);
   generating a set of dictionary files indicating data structural information for the program binary executable based at least in part on running the set of ASP scripts on the program binary executable;
   combining the data structural information from the set of dictionary files with an ASP library to generate an extended ASP library;
   augmenting the program binary executable with the extended ASP library to generate an augmented program binary executable; and
   performing an introspection and data discovery procedure on a C-language program using the augmented program binary executable.

2. The method of claim 1, wherein generating the set of dictionary files comprises:
   identifying the data structural information of the program binary executable, wherein the data structural information comprises a list of C-structures referenced, names of fields in the C-structures, definitions of individual fields including data type names and data type definitions, additional data type definitions compiled in the program binary executable, references to nested substructures, layouts of bit fields in structured fields, enumerated type definitions including names and enumerated constant values, or any combination thereof.

3. The method of claim 2, wherein generating the set of dictionary files comprises:
generating a set of internal structure definition tables.

4. The method of claim 3, wherein the set of internal structure definition tables comprise structural definition description (SDD) dictionaries for all data structures in the program binary executable.

5. The method of claim 3, wherein generating the set of internal structure definition tables comprises:
executing a first shell script of the set of ASP scripts to generate a set of intermediate files indicating the data structural information; and
executing a second table generation script to generate the set of internal structure definition tables using the set of intermediate files.

6. The method of claim 1, wherein the augmented program binary executable is generated at a build-time associated with the C-language program, and wherein the introspection and data discovery procedure is performed dynamically at a run-time associated with the C-language program.

7. The method of claim 1, further comprising:
performing the introspection and data discovery procedure on the C-language program comprises printing data structures of the C-language program, examining the C-language program, debugging the C-language program, performing trace operations on the C-language program, or any combination thereof.

8. The method of claim 7, further comprising:
performing the introspection and data discovery procedure on the C-language program comprises executing an ASP application programming interface (API), wherein the ASP API supports querying the data structural information of the C-language program, generating a catalog of field descriptions, structure layout, and enumerated type information of the C-language program, or any combination thereof.

9. The method of claim 1, further comprising:
running the set of ASP scripts on the program binary executable comprises running a debugging program to extract structural information compiled in the program binary executable.

10. An apparatus for data processing, comprising:
one or more processors;
one or more memories coupled with the one or more processors; and
instructions stored in the one or more memories and executable by the one or more processors to cause the apparatus to:
run a set of automated structure processing (ASP) scripts on a program binary executable written in C programming language (C-language);
generate a set of dictionary files indicating data structural information for the program binary executable based at least in part on running the set of ASP scripts on the program binary executable;
combine the data structural information from the set of dictionary files with an ASP library to generate an extended ASP library;
augment the program binary executable with the extended ASP library to generate an augmented program binary executable; and
perform an introspection and data discovery procedure on a C-language program using the augmented program binary executable.

11. The apparatus of claim 10, wherein the instructions to generate the set of dictionary files are executable by the one or more processors to cause the apparatus to:
identify the data structural information of the program binary executable, wherein the data structural information comprises a list of C-structures referenced, names of fields in the C-structures, definitions of individual fields including data type names and data type definitions, additional data type definitions compiled in the program binary executable, references to nested substructures, layouts of bit fields in structured fields, enumerated type definitions including names and enumerated constant values, or any combination thereof.

12. The apparatus of claim 11, wherein the instructions to generate the set of dictionary files are executable by the one or more processors to cause the apparatus to:
generate a set of internal structure definition tables.

13. The apparatus of claim 12, wherein the set of internal structure definition tables comprise structural definition description (SDD) dictionaries for all data structures in the program binary executable.

14. The apparatus of claim 12, wherein the instructions to generate the set of internal structure definition tables are executable by the one or more processors to cause the apparatus to:
execute a first shell script of the set of ASP scripts to generate a set of intermediate files indicating the data structural information; and
execute a second table generation script to generate the set of internal structure definition tables using the set of intermediate files.

15. The apparatus of claim 10, wherein the augmented program binary executable is generated at a build-time associated with the C-language program, and wherein the introspection and data discovery procedure is performed dynamically at a run-time associated with the C-language program.

16. The apparatus of claim 10, wherein the instructions are further executable by the one or more processors to cause the apparatus to:
perform the introspection and data discovery procedure on the C-language program comprises printing data structures of the C-language program, examining the C-language program, debugging the C-language program, performing trace operations on the C-language program, or any combination thereof.

17. The apparatus of claim 16, wherein the instructions are further executable by the one or more processors to cause the apparatus to:
perform the introspection and data discovery procedure on the C-language program comprises executing an ASP application programming interface (API), wherein the ASP API supports querying the data structural information of the C-language program, generating a catalog of field descriptions, structure layout, and enumerated type information of the C-language program, or any combination thereof.

18. The apparatus of claim 10, wherein the instructions are further executable by the one or more processors to cause the apparatus to:
run the set of ASP scripts on the program binary executable comprises running a debugging program to extract structural information compiled in the program binary executable.

19. A non-transitory computer-readable medium, excluding signals, storing code for data processing, the code comprising instructions executable by a processor to:
- run a set of automated structure processing (ASP) scripts on a program binary executable written in C programming language (C-language);
- generate a set of dictionary files indicating data structural information for the program binary executable based at least in part on running the set of ASP scripts on the program binary executable;
- combine the data structural information from the set of dictionary files with an ASP library to generate an extended ASP library;
- augment the program binary executable with the extended ASP library to generate an augmented program binary executable; and
- perform an introspection and data discovery procedure on a C-language program using the augmented program binary executable.

20. The non-transitory computer-readable medium of claim 19, wherein the instructions to generate the set of dictionary files are executable by the processor to:
- identify the data structural information of the program binary executable, wherein the data structural information comprises a list of C-structures referenced, names of fields in the C-structures, definitions of individual fields including data type names and data type definitions, additional data type definitions compiled in the program binary executable, references to nested substructures, layouts of bit fields in structured fields, enumerated type definitions including names and enumerated constant values, or any combination thereof.

* * * * *